US010896058B2

(12) United States Patent
Hackett et al.

(10) Patent No.: US 10,896,058 B2
(45) Date of Patent: *Jan. 19, 2021

(54) MANAGING VIRTUAL CLUSTERING ENVIRONMENTS ACCORDING TO REQUIREMENTS

(71) Applicant: INTERNATIONAL BUSINESS MACHINES CORPORATION, Armonk, NY (US)

(72) Inventors: Joseph E. Hackett, Fort Worth, TX (US); Leonard S. Hand, Rochester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/399,869

(22) Filed: Apr. 30, 2019

(65) Prior Publication Data

US 2019/0258509 A1 Aug. 22, 2019

Related U.S. Application Data

(63) Continuation of application No. 13/760,396, filed on Feb. 6, 2013, now Pat. No. 10,318,342.

(51) Int. Cl.
G06F 9/48 (2006.01)
G06F 9/50 (2006.01)
(Continued)

(52) U.S. Cl.
CPC ........ *G06F 9/4856* (2013.01); *G06F 9/45558* (2013.01); *G06F 9/5088* (2013.01);
(Continued)

(58) Field of Classification Search
CPC .. G06F 9/4856; G06F 9/45558; G06F 9/5088; G06F 11/3006; G06F 11/3055;
(Continued)

(56) References Cited

U.S. PATENT DOCUMENTS 7,533,385 B1 5/2009 Barnes
8,095,929 B1 1/2012 Ji
(Continued)

OTHER PUBLICATIONS

U.S. Appl. No. 13/760,396, Non-Final Office Action, dated Feb. 12, 2015, 14 pg.
(Continued)

*Primary Examiner* — Jacob D Dascomb
(74) *Attorney, Agent, or Firm* — Cuenot, Forsythe & Kim, LLC

(57) ABSTRACT

Managing virtual machines includes determining an operating parameter of a device during operation of the device as part of a cluster of devices while the device hosts a virtual machine and comparing, using a processor, a requirement for the virtual machine with the operating parameter. A view of the virtual machine operating within the device of the cluster can be displayed. A result of the comparison can be indicated through application of a visualization technique to an identifier representing the virtual machine within the view.

18 Claims, 9 Drawing Sheets

(51) Int. Cl.
*G06F 11/30* (2006.01)
*G06F 11/32* (2006.01)
*G06F 9/455* (2018.01)

(52) U.S. Cl.
CPC ...... *G06F 11/3006* (2013.01); *G06F 11/3055* (2013.01); *G06F 11/321* (2013.01); *G06F 2009/4557* (2013.01); *G06F 2201/815* (2013.01); *G06F 2209/503* (2013.01)

(58) Field of Classification Search
CPC ........... G06F 11/321; G06F 2009/4557; G06F 2009/503; G06F 2201/815
See application file for complete search history.

(56) References Cited

U.S. PATENT DOCUMENTS

| | | |
|---|---|---|
| 8,175,863 B1 | 5/2012 | Ostermeyer |
| 8,364,460 B2 * | 1/2013 | Ostermeyer ........ G06F 9/45558 703/22 |
| 8,499,066 B1 | 7/2013 | Zhang |
| 10,055,239 B2 * | 8/2018 | Adogla ............... G06F 11/3409 |
| 2010/0235832 A1 | 9/2010 | Rajagopal |
| 2012/0284713 A1 | 11/2012 | Ostermeyer |
| 2012/0311576 A1 | 12/2012 | Shu |
| 2014/0223428 A1 | 8/2014 | Hackett et al. |

OTHER PUBLICATIONS

U.S. Appl. No. 13/760,396, Final Office Action, dated Jul. 6, 2015, 16 pg.
U.S. Appl. No. 13/760,396, Examiner's Answer, dated Apr. 8, 2016, 12 pg.
U.S. Appl. No. 13/760,396, Decision on Appeal, Nov. 2, 2017, 7 pg.
U.S. Appl. No. 13/760,396, Decision on Request for Reconsideration, Mar. 2, 2018, 5 pg.
U.S. Appl. No. 13/760,396, Non-Final Office Action, dated Aug. 30, 2018, 14 pg.
U.S. Appl. No. 13/760,396, Notice of Allowance, dated Jan. 31, 2019, 12 pg.
Mell, P. et al., The NIST Definition of Cloud Computing, National Institute of Standards and Technology, U.S. Dept. of Commerce, Special Publication 800-145, Sep. 2011, 7 pg.

* cited by examiner

900

| Capability | Device 1 | Device 2 | Device 3 | Device 4 |
|---|---|---|---|---|
| 1 | 100/12/-1 | 99/34/+2 | 100/30/0 | 50/33/-3 |
| 2 | 100/12/0 | 100/34/+2 | 90/30/0 | 40/33/-5 |
| 3 | 100/15/0 | 100/1/-1 | 100/12/0 | 100/20/+1 |

| VM | Current Interval Score | Multiple | Miss Score |
|---|---|---|---|
| Requirement 1 | 100 | 1 | 0 |
| Requirement 2 | 98 | 3 | 2 |
| Requirement 3 | 97 | 1 | 3 |
| Requirement 4 | 100 | 1 | 0 |
| Total Miss Score | - | - | 9 |

| Time | T+1 | T+2 | T+3 | T+4 | T+5 | T+6 | T+7 | T+8 | T+n | Current Score |
|---|---|---|---|---|---|---|---|---|---|---|
| Score | 0 | | | | | | | | | |
| Marker | End | | | | | | | | | 0 |
| Score | 0 | 5 | | | | | | | | |
| Marker | | Start End | | | | | | | | 5 |
| Score | 0 | 5 | 9 | | | | | | | |
| Marker | | Start | End | | | | | | | 14 |
| Score | 0 | 5 | 9 | 6 | | | | | | |
| Marker | | Start | | End | | | | | | 20 |
| Score | 0 | 5 | 9 | 6 | 4 | | | | | |
| Marker | | Start | | | End | | | | | 24 |
| Score | 0 | 5 | 9 | 6 | 4 | 0 | | | | |
| Marker | | | Start | | | End | | | | 19 |
| Score | 0 | 5 | 9 | 6 | 4 | 0 | 0 | | | |
| Marker | | | | Start | | | End | | | 10 |
| Score | 0 | 5 | 9 | 6 | 4 | 0 | 0 | 5 | | |
| Marker | | | | Start | | | | End | | 15 |
| Score | 0 | 5 | 9 | 6 | 4 | 0 | 0 | 5 | 9 | |
| Marker | | | | Start | | | | | End | 24 |

MANAGING VIRTUAL CLUSTERING ENVIRONMENTS ACCORDING TO REQUIREMENTS

BACKGROUND

Server virtualization, referred to as simply as "virtualization," is a technique in which a physical computing resource such as a server is represented as a programmatic simulation or model called a "virtual machine." The virtual machine is hosted by, e.g., is operated or executed on, a physical device. Virtualization allows a single physical device to host two or more different virtual machines concurrently, thereby significantly reducing the number of physical devices needed to implement a given IT infrastructure. The ease with which virtual machines can be created coupled with the reality that a dedicated physical server is not required for each new virtual machine has reduced physical server sprawl while increasing virtual machine sprawl. As such, managing virtual machines and virtual computing environments has become problematic.

BRIEF SUMMARY

A method includes determining an operating parameter of a device during operation of the device as part of a cluster of devices while the device hosts a virtual machine (VM), comparing, using a processor, a requirement for the VM with the operating parameter, and displaying a view of the VM operating within the device of the cluster. The method further includes indicating a result of the comparison through application of a visualization technique to an identifier representing the VM within the view.

A system includes a display including a view of a cluster. The view includes a plurality of device visualizations. Each device visualization represents a device of the cluster. For each device, the device visualization includes at least one identifier representing a VM hosted by the device. An appearance of at least one identifier representing a VM is updated over time according to a comparison of a capability of the device to a requirement of the VM represented by the at least one identifier.

A system includes a processor programmed to initiate executable operations. The executable operations include determining an operating parameter of a device during operation of the device as part of a cluster of devices while the device hosts a VM, comparing a requirement for the VM with the operating parameter, and displaying a view of the VM operating within the device of the cluster. The executable operations further include indicating a result of the comparison through application of a visualization technique to an identifier representing the VM within the view.

A computer program product includes a computer readable storage medium having program code stored thereon. The program code is executable by a processor to perform a method. The method includes determining, using the processor, an operating parameter of a device during operation of the device as part of a cluster of devices while the device hosts a VM, comparing, using the processor, a requirement for the VM with the operating parameter, and displaying a view of the VM operating within the device of the cluster. The method further includes indicating a result of the comparison through application of a visualization technique to an identifier representing the VM within the view.

BRIEF DESCRIPTION OF THE SEVERAL VIEWS OF THE DRAWINGS

FIG. 9 is a table illustrating an exemplary technique for scoring a device.
FIG. 10 is a table illustrating an exemplary technique for determining a score for a VM.
FIG. 11 is a table illustrating an exemplary technique for determining whether a VM should be transferred to a different hosting device.

DETAILED DESCRIPTION

Figure 1:
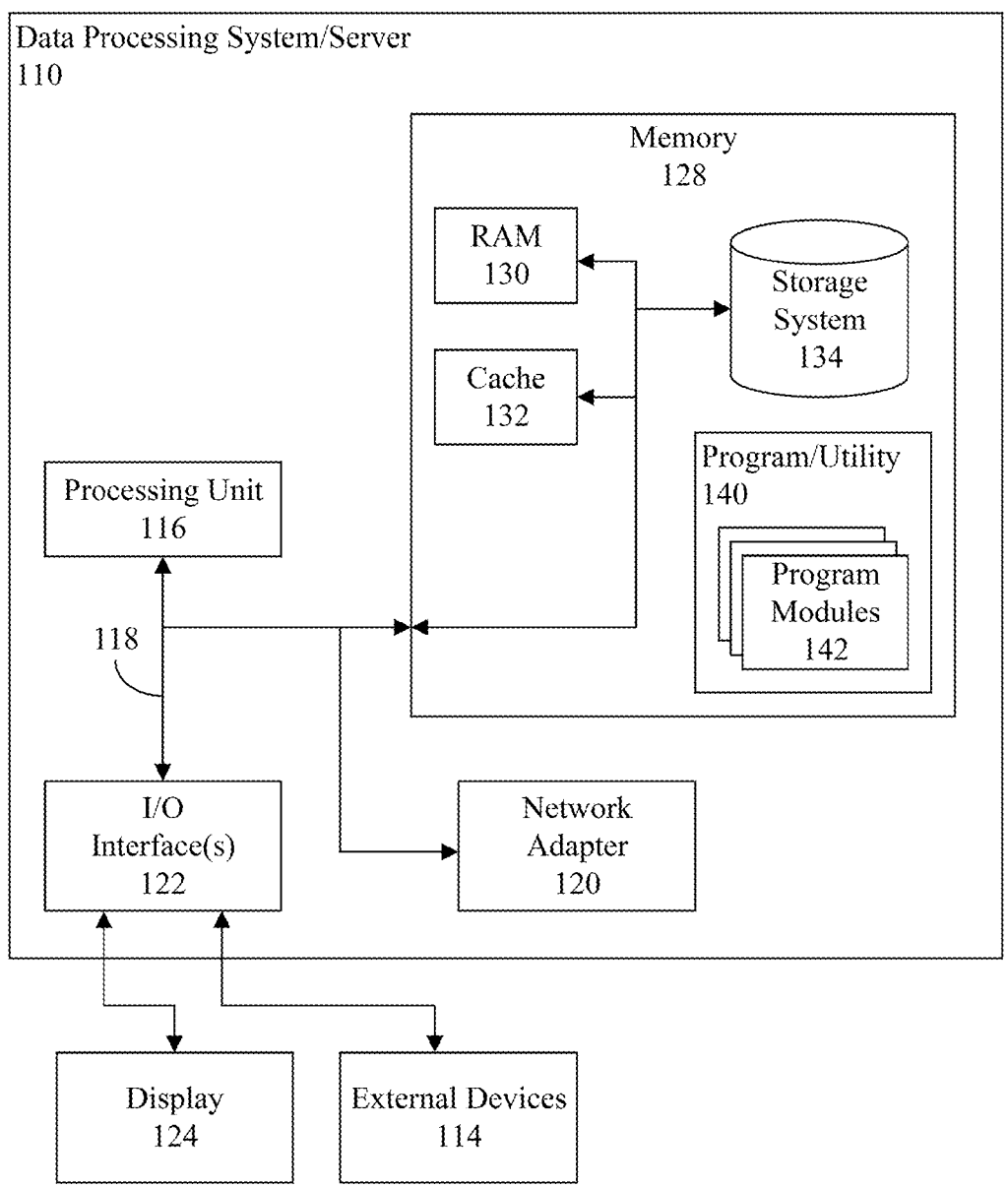
FIG. 1 depicts an example of a cloud computing node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This specification includes a detailed description of cloud computing. Implementation of the teachings recited herein, however, is not limited to a cloud and/or virtual computing environment. Rather, one or more embodiments of the present invention can be implemented in conjunction with any other type of computing environment and/or data processing system now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models are as follows:

Software as a Service (SaaS): the capability provided to the consumer to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models are as follows:

Private cloud: the cloud infrastructure is operated solely for an organization. The cloud infrastructure may be managed by the organization or a third party and may exist on-premises or off-premises.

Community cloud: the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. Cloud computing is an infrastructure including a network of interconnected nodes. In this regard, the term "cloud," as used herein, means a computing infrastructure including a plurality of nodes that are interconnected via a suitable communication network. From the perspective of a client, a cloud appears as a single resource. Although the cloud appears to the client as a single resource, via the various nodes of the cloud, the cloud can provide to the client a myriad of different functions, such as data processing, data storage, services, applications, etc. By way of example, a cloud can appear to the client as a single server, though in actuality the cloud may be formed of a plurality of servers, storage systems, networking components, services, applications, etc., as will be described herein.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an example of a computing node 100. Computing node 100 can be used within a cloud computing environment, e.g., as a cloud computing node. Computing node 100 is only one example of a suitable cloud computing node and is not intended to suggest any limitation as to the scope of use or functionality of the one or more embodiments described herein. Regardless, computing node 100 is capable of being implemented and/or performing any of the functions and/or operations set forth within this specification.

Computing node 100 can include a data processing system/server 110, which is operational with numerous other general purpose or special purpose computing system environments or configurations. Examples of well-known computing systems, environments, and/or configurations that may be suitable for use with data processing system/server 110 include, but are not limited to, personal computer systems, server computer systems, control nodes, storage area network (SAN) controllers, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Data processing system/server 110 may be described in the general context of computer system executable instructions, such as program modules, being executed by a computer system or other processing system. Generally, program modules may include routines, programs, objects, components, logic, data structures, and so on that perform particular tasks or implement particular abstract data types. Data processing system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, data processing system/server 110 in computing node 100 is shown in the form of a general-purpose computing device. The components of data processing system/server 110 may include, but are not limited to, one or more processors (e.g., central processing units or CPUs) or processing units 116, a system memory 128, and a bus 118 or other suitable circuitry that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Data processing system/server 110 typically includes a variety of computer-readable storage media. Such media may be any available media that is accessible by data processing system/server 110, and can include volatile and non-volatile media and/or removable and non-removable media. System memory 128 can include computer-readable storage media in the form of volatile memory, such as RAM 130 and/or cache memory 132. Data processing system/server 110 may further include other removable/non-removable, volatile/non-volatile computer-readable storage media.

By way of example only, a storage system 134 can be provided for reading from and writing to at least one non-volatile computer-readable storage media. Examples of computer-readable storage media can include, but are not limited to, a data storage device that comprises non-volatile magnetic media (e.g., a "hard disk drive" or "HDD"), a data storage device that comprises non-volatile solid state media (e.g., a "solid state drive" or "SSD"), a data storage device that comprises non-volatile magneto-optical media, and the like. Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, a solid state drive for reading from or writing to a removable, non-volatile, solid state drive can be provided. In such instances, each can be connected to the bus 118 by one or more data media interfaces, such as a fiber channel interface, a serial advanced technology attachment (SATA) interface, fiber channel interface, a small computer system interface (SCSI) interface, a serial attached SCSI (SAS) interface, or the like.

Memory 128 may include at least one computer program product that includes a computer-readable storage medium having computer-readable program code embodied therewith. The "computer-readable storage medium" is non-transitory in nature. The computer-readable program code can include a set (e.g., at least one) of program modules 142 that are configured to carry out the functions and/or operations of embodiments of the invention when executed. Program/utility 140, having a set (at least one) of program modules 142, may be stored in the memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein. In this regard, program modules 142 and data operated upon by program modules 142 are functional data structures in that impart functionality when employed as part of computing node 100 and/or data processing system/server 110.

Data processing system/server 110 may also communicate with one or more external devices 114 such as a keyboard, a pointing device, a display 124, etc.; one or more devices that enable a user to interact with processing system/server 110; and/or any devices (e.g., network card, modem, transceiver, etc.) that enable processing system/server 110 to communicate with one or more other computing devices. Such communication can occur via Input/Output (I/O) interfaces 122.

Data processing system/server 110 further can communicate with one or more networks such as a LAN, a general WAN, and/or a public network (e.g., the Internet) via network adapter 120. As depicted, network adapter 120 can communicate with the other components of data processing system/server 110 via bus 118. It should be understood that although not shown, other hardware and/or software components could be used in conjunction with data processing system/server 110. Examples, include, but are not limited to: microcode, device drivers, redundant processing units, external disk drive arrays, RAID systems, tape drives, and data archival storage systems, etc.

Figure 2:
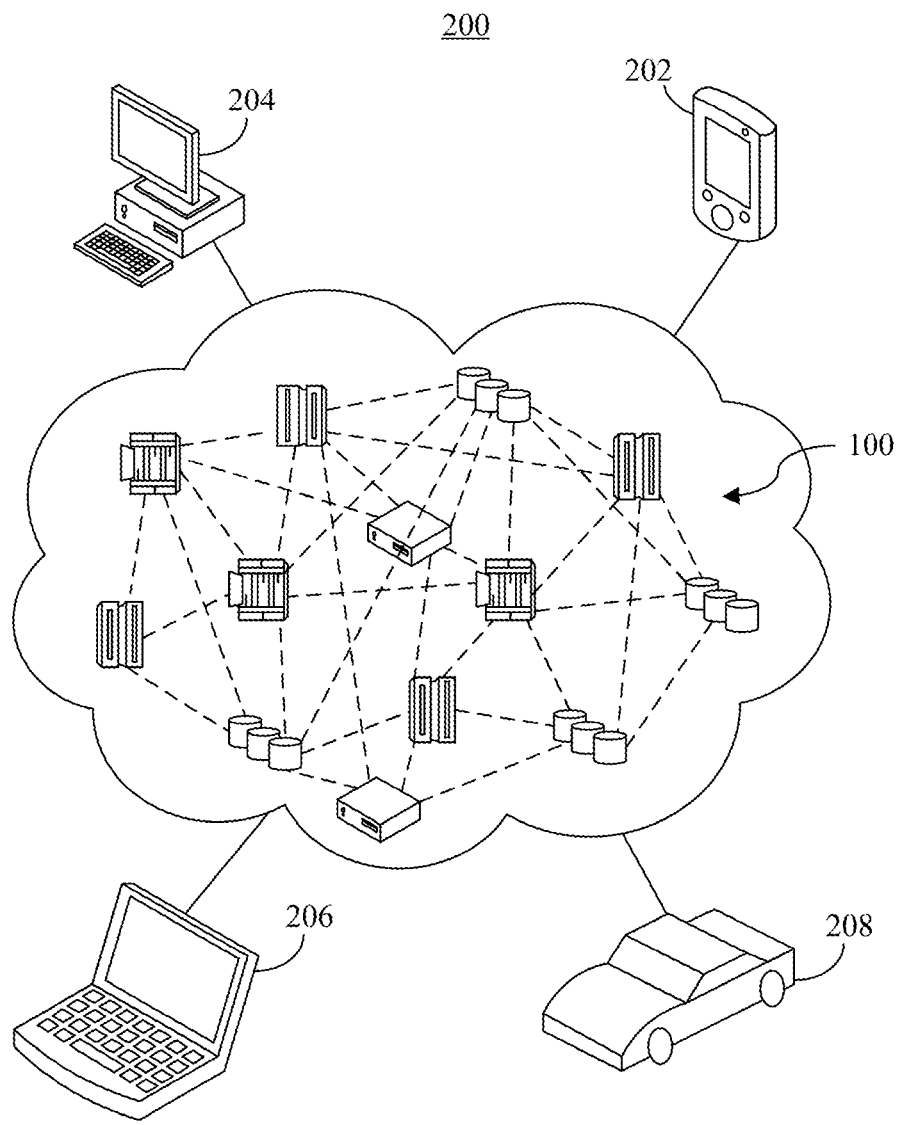
FIG. 2 depicts an example of a clouds computing environment.

FIG. 2 shows an example of a cloud computing environment 200. As shown, cloud computing environment 200 comprises one or more cloud computing nodes 100 with which local computing devices used by cloud consumers, such as, for example, a personal digital assistant (PDA) or cellular telephone 202, a desktop computer (or workstation) 204, a laptop computer 206, and/or an automobile computer system 208 may communicate. Computing nodes 100 may communicate with one another and be grouped (not shown) physically or virtually, in one or more networks, such as Private, Community, Public, or Hybrid clouds as described hereinabove, or a combination thereof. As such, cloud computing environment 200 provides infrastructure, platforms, and/or software as services for which a cloud consumer does not need to maintain resources on a local computing device. It is understood that the types of computing devices 202-208 shown in FIG. 2 are intended to be illustrative only and that computing nodes 100 and cloud computing environment 200 can communicate with any type of computerized device over any type of network and/or network addressable connection (e.g., using a web browser).

Figure 3:
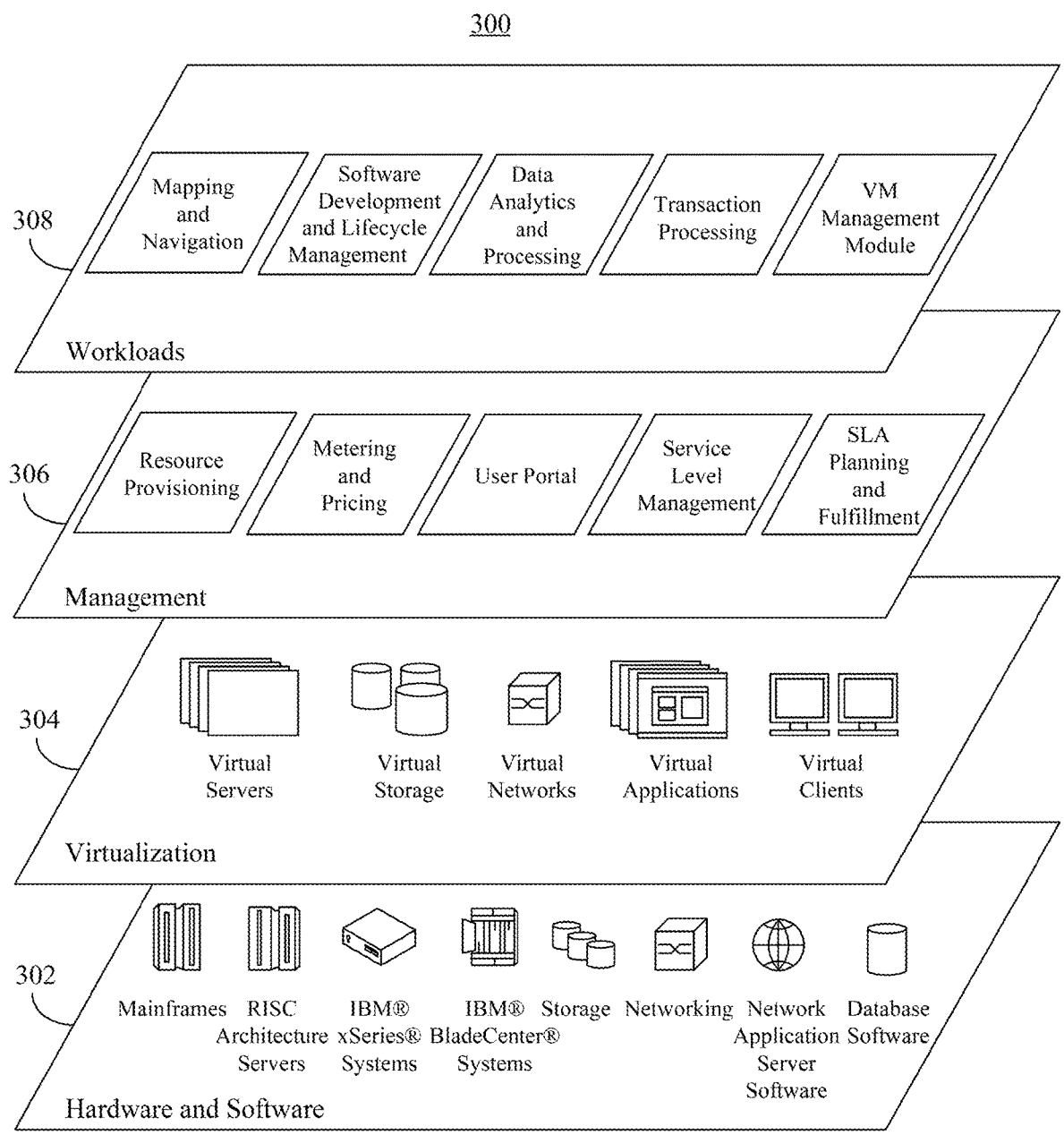
FIG. 3 depicts exemplary abstraction model layers for a cloud computing environment.

FIG. 3 illustrates a set 300 of functional abstraction layers provided by cloud computing environment 200 of FIG. 2. It should be understood in advance that the components, layers, and functions shown in FIG. 3 are intended to be illustrative only. As such, the one or more embodiments disclosed within this specification are not intended to be limited by the examples shown. As depicted, the following layers and corresponding functions are provided:

A hardware and software layer 302 can include hardware and software components. Examples of hardware components, e.g., devices, include, but are not limited to, mainframes, in one example IBM® zSeries® systems; RISC (Reduced Instruction Set Computer) architecture based servers, in one example IBM pSeries® systems; IBM xSeries® systems; IBM BladeCenter® systems; storage systems (e.g., storage arrays, network attached storages (NASs), and the like); and networking components. Networking components can include any of a variety of routers, switches, network adapters, and the like.

Examples of software components include network application server software, in one example IBM Web Sphere® application server software; and RAID array control software, in one example IBM SAN volume controller, which can execute on an IBM SVC Storage Engine. (IBM, zSeries, pSeries, xSeries, BladeCenter, WebSphere, and DB2 are trademarks of International Business Machines Corporation registered in many jurisdictions worldwide). The software components also may include database software which contains data related to the configuration of the cloud computing environment.

A virtualization layer 304 can provide an abstraction layer from which the following examples of virtual entities may be provided: virtual servers; virtual storage; virtual networks, including virtual private networks; virtual applications and operating systems; and virtual clients.

In one example, a management layer 306 may provide the functions described below. Resource provisioning provides dynamic procurement of computing resources and other resources that are utilized to perform tasks within the cloud computing environment. Storage management manages the virtual storage within the cloud computing environment. The user portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 308 can provide workloads for which the cloud computing environment may be utilized. Examples of workloads and functions which may be provided from this layer may include, but are not limited to, mapping and navigation, software development and lifecycle management, data analytics processing, transaction processing, and data clients. Still, the workloads layer 308 can include any other applications and/or workloads suitable to be deployed in a cloud computing environment, and the embodiments disclosed herein are not limited in this regard.

In one aspect, workloads layer 308 includes a virtual machine (VM) management module that facilitates management of virtual resources within the cloud computing environment. For purposes of description, the particular data processing system or node executing the VM management module is referred to as the VM management system. The VM management system is configured to evaluate the requirements for VMs with respect to the particular devices that host the VMs. Exemplary requirements for a VM include items such as CPU resources, memory, I/O, as well as other items such as access control, encryption, licensing, geographic location, service level agreements, user affinity, and the like. The VM management system performs the evaluation over time as requirements for a VM and operating conditions experienced by the devices hosting the VM change.

In another aspect the VM management system provides a user interface (UI) illustrating the state of clustering within the virtual and/or cloud computing environment. Through the UI, an end user is able to determine whether a cluster of devices and/or a specific device of the cluster is meeting the requirements of one or more or all of the VMs hosted by the cluster and/or device as the case may be. The term "host," as used within this specification, refers to a physical device (e.g., a data processing system or server) or a collection of resources of physical devices upon which a VM operates or executes. The term "hosting" refers to the act of being a host or performing functions of a host.

Figure 4:
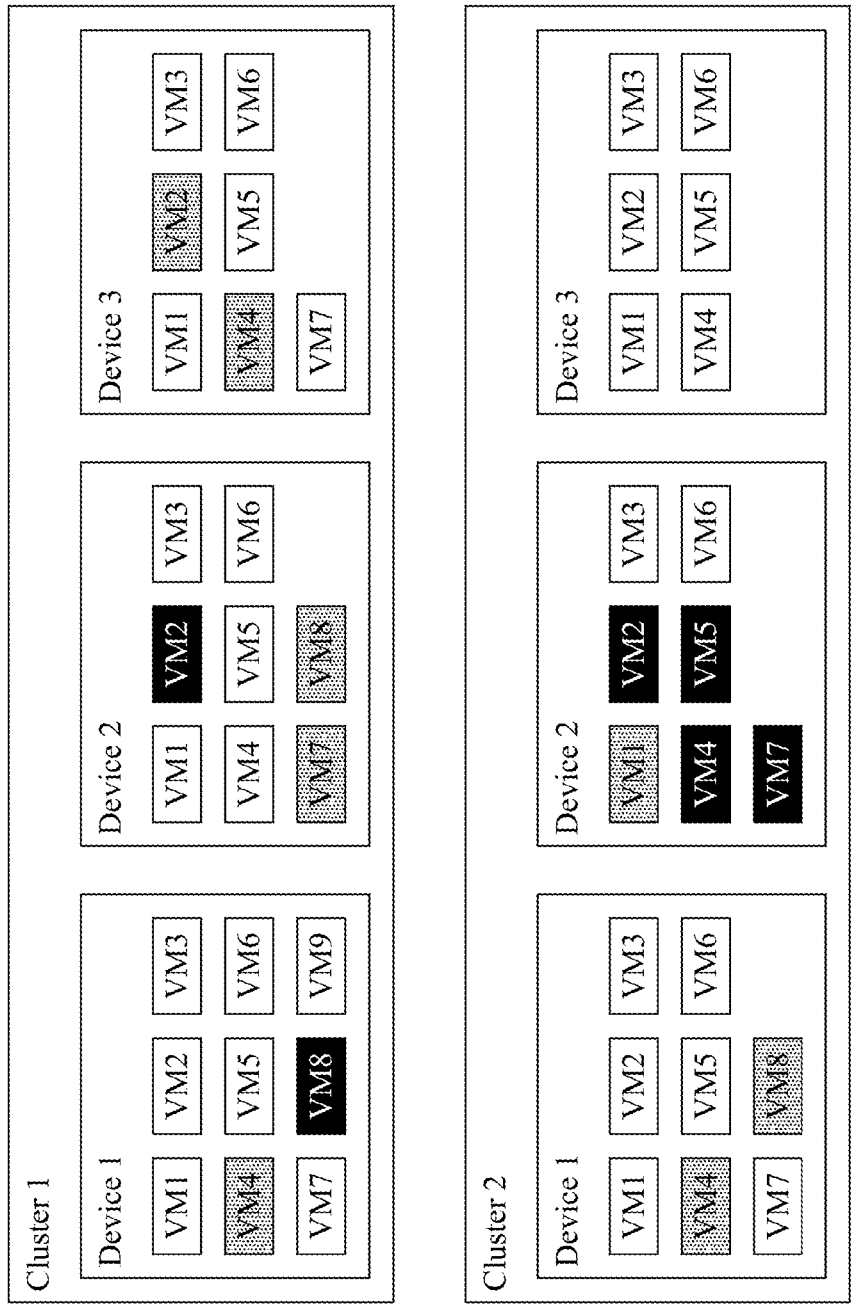
FIG. 4 is a view displayed as part of a user interface (UI) generated by a virtual machine management system described with reference to FIG. 3.

FIG. 4 is a view 400 displayed as part of the UI generated by the VM management system described with reference to FIG. 3. View 400 is a dashboard view that graphically illustrates two clusters of a cloud computing environment denoted as "Cluster 1" and "Cluster 2." A cluster is a logical grouping of one or more devices that are communicatively linked with one another and managed as a unit. A cluster further shares one or more or all of the resources (e.g., physical assets) that are bound to the individual VMs included therein. Examples of devices of a cluster include physical data processing systems such as processing system/server 110 of FIG. 1 and/or other physical data processing and/or computing systems. A device further can be a "resource pool." A resource pool is a logical pool or grouping of resources, e.g., CPU, memory, or the like, of one or more physical devices in the cluster. For example, a resource pool is a logical pooling of CPUs and memory from one or more physical devices (e.g., computers) in the cluster.

As pictured, each cluster includes three devices denoted as "Device 1," "Device 2," and "Device 3." In one aspect, each device representation (i.e., Device 1, Device 2, and Device 3) pictured in FIG. 4 represents a physical device. In another aspect, each device representation pictured in FIG. 4 represents a resource pool.

A cluster is typically organized to include selected devices based upon licenses and/or operating systems as opposed to service levels, though this need not be the case. It should be appreciated that the particular number of devices within a cluster and the number of clusters shown is for purposes of illustration. A cluster can include fewer than three devices or more than three devices. Further, a virtual computing environment can include fewer than two clusters or more than two clusters. As such, the one or more embodiments disclosed within this specification are not intended to be limited to a particular number of devices within a cluster or a particular number of clusters. Appreciably, view 400 can be scaled according to the particular implementation of the virtual computing environment.

Each device of a cluster includes one or more VMs. A VM is a programmatic simulation of a physical machine that is hosted by a device. A VM, for example, is created based on specifications of a hypothetical computer or emulates a computer architecture and/or functions of a real world computer including the operational software. As noted, each cluster is managed. In one aspect, a VM can be moved as part of the management function from one device of a cluster to another device of the same cluster, for example, under control of the VM management system. Further, a VM can be moved from one cluster to another cluster and to any device located within other cluster under the control of the VM management system.

Each of the VMs hosted by a device in a cluster can be associated with one or more requirements. In one aspect, the requirements of a VM can be implemented as tags that are associated with the VM. Requirements for a VM, regardless of the data structure used, form a data model of the VM. The requirements can be stored as part of the VM itself or within another data repository and associated with the VM. As noted, exemplary requirements include, but are not limited to, CPU resources, memory, I/O, access control, encryption, licensing, geographic location, e.g., number of hops to a given location, service level agreements, user affinity, and the like. View 400 illustrated in FIG. 4 is, at least in part, generated from the data model of the VMs shown.

Each device of a cluster is associated with a set of capabilities. These capabilities are at a maximum while the device is unused. As the device enters a production environment in a cluster and begins hosting VMs, the capabilities are diminished and continue to vary with the load placed on the device over time. The capabilities of the device can be measured by the state, e.g., values, of one or more operating parameters of the device at any given time and stored to maintain historical and trend data for the device over time. Appreciably, the capabilities of a given cluster are an aggregation of the capabilities of each device in the cluster. As such, a cluster may be capable of meeting a particular requirement, while a particular device within the cluster is not.

Referring to view 400, each VM is represented by an identifier labelled as "VMN," where N is an integer number. The appearance of each identifier representing a VM within a cluster is changed through application of a visualization technique to indicate whether the requirements of the VM are met by the device hosting the VM. For purposes of illustration, reference to a VM in FIG. 4 may also refer to the identifier representing the VM. Accordingly, a VM without shading, e.g., VM1 of Device 1 in Cluster 1, indicates that the requirements of the VM are being met by the device hosting the VM. Thus, Device 1 of Cluster 1 is meeting the requirements of VM1. Shading such as that of VM4 of Device 1 of Cluster 1 indicates that one or more requirements of VM4 are not being met by Device 1 of Cluster 1. The shading of VM8 of Device 1 of Cluster 1 indicates that even fewer requirements of VM8 are being met by Device 1 of Cluster 1.

Because the information relating to VM requirements being met and device capabilities is stored or persisted over time, the amount of time any of the VMs illustrated in FIG. 4 remain in a given state, e.g., the states illustrated by VM1, VM4, and VM8 of Device 1 of Cluster 1, also can be determined.

An indication that one or more requirements of a VM are not being met by the device hosting the VM effectively notifies a user or administrator that the VM should likely be moved to another device and/or another cluster in order to better meet the requirements of the VM. In one aspect, the VM management system can provide a recommendation as to which device (and thus, which cluster) a given VM should be moved to achieve a better match of requirements for the VM with the capabilities of the hosting device.

Figure 5:
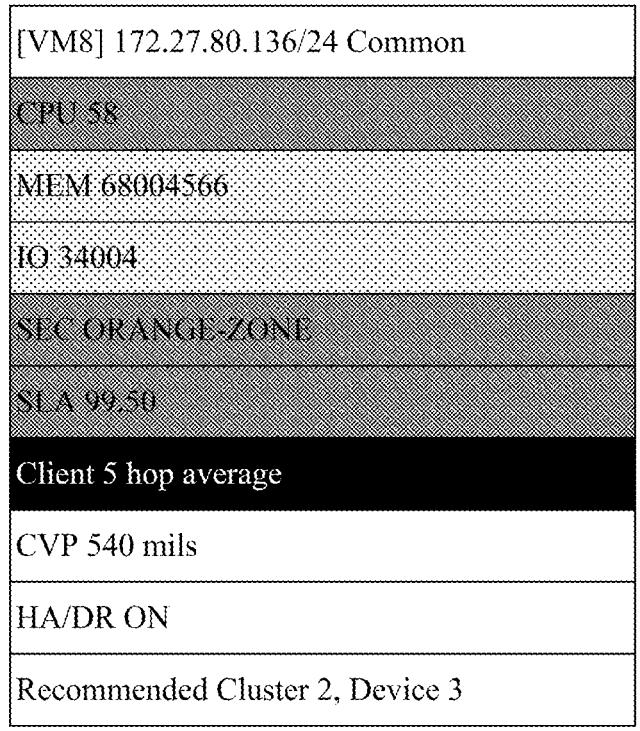
FIG. 5 is a view displayed as part of the UI of the virtual machine management system.

FIG. 5 is a view 500 displayed as part of the UI generated by the VM management system. In one aspect, view 500 is displayed responsive to a user input selecting a particular identifier representing a VM within view 400 of FIG. 4. For example, responsive to a user selection of VM8 of Cluster 1 and Device 1, view 500 is presented, which provides specific information as to which requirements of VM8 are being met and which are not.

View 500 presents operating parameter values of Device 1 of Cluster 1. As noted, the value of an operating parameter indicates the state or status of a capability of the device at a given point in time. The values further are compared with the requirements of VM8. A visualization technique, e.g., shading and/or color coding, is applied to each operational parameter to indicate a result of the comparison. For example, for each of the illustrated operational parameters shown, e.g., CPU usage, IO usage, security level, SLA, average number of hops to a client of VM8, Content Verification Process (CVP), and High Availability/Disaster Recovery (HA/DR), a visualization technique can be applied that indicates whether the value of the operational parameter of the device is meeting, exceeding, or not meeting a corresponding requirement of VM8.

A content verification process is a procedure used to determine whether one or more services offered by a VM are performing as expected, e.g., in accordance with any requirements of the VM. In the example of FIG. 5, one or more real transactions, e.g., a ping, can be checked. For example, a ping can be performed as part of a CVP. The response time to the ping, which is 540 milliseconds in this example, can be measured against an expected or a required response time as part of the CVP. The type of response generated by the VM also can be evaluated as part of the CVP. A 404 error received in response from the VM would likely exhibit fast timing, but is indicative of an error and that the VM is not meeting some requirement or expectation. HA/DR refers to a data replication feature used to guard against data (e.g., VM) loss that can be turned on or off for any given VM.

It should be appreciated that any of a variety of different visualization techniques can be applied such as color coding, patterning, shading, or values showing a percentage or other amount by which a particular operational parameter is missing the requirement of VM8. The example presented in view 500 illustrates that the requirements for client hop average of VM8 are not being met by a large margin; the requirements for CPU, security (SEC), and SLA are shown to be missing the requirements of VM8 by a smaller margin; the requirements for memory and IO are not met occasionally; while the requirements for CVP and HA/DR are being met.

In another example, view 500 can display the requirement of the virtual machine and the value of the operating parameter of the device that is compared with the requirement of the virtual machine.

In the last row of view 500, a recommended target destination is provided. In this example, the VM management system recommends that VM8 be moved to Device 3 of Cluster 2. Relocating VM8 as recommended is expected to result in a greater number, if not all, of the requirements of VM8 being met.

FIG. 5 is presented for purposes of illustration only. As such, the particular operational parameters that are shown are not intended to be an exhaustive list or intended to limit the one or more embodiments disclosed within this specification. In illustration, further operational parameters can be displayed or included such as "network bandwidth potential," "cache," "outstanding connections," "operating systems supported," or the like.

Figure 6:
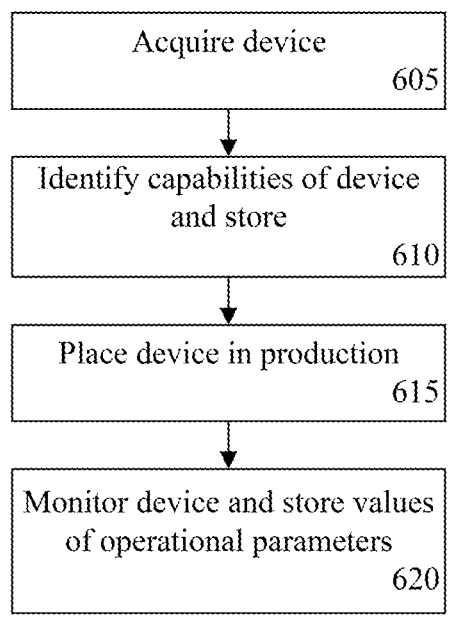
FIG. 6 is a flow chart illustrating an exemplary method of device management.

FIG. 6 is a flow chart illustrating an exemplary method 600 of device management. Method 600 can be performed by the VM management system described with reference to FIG. 3. In block 605, a device is acquired. For example, the device can be added to a larger computing system such as a cloud and/or virtual computing environment. In block 610, the VM management system identifies and stores the capabilities of the device. In block 615, the VM management system places the device into production. For example, the device can be placed in operation as part of a cluster or as a standalone computing system available in the larger computing environment. In block 620, the VM management system monitors the device and stores values of operational parameters of the device to indicate capability of the device over time during operation under changing loads.

Figure 7:
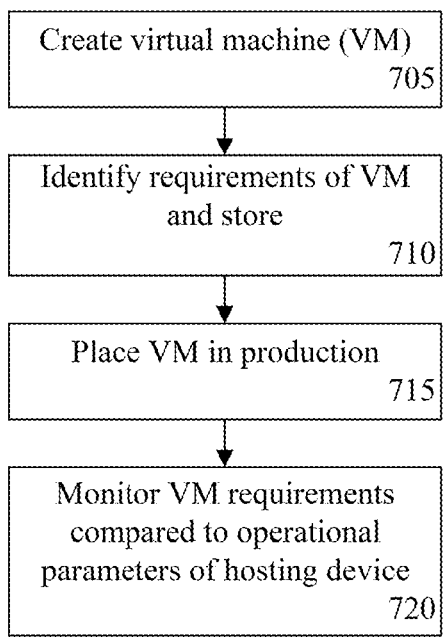
FIG. 7 is a flow chart illustrating an exemplary method of VM management.

FIG. 7 is a flow chart illustrating an exemplary method 700 of VM management. Method 700 can be performed by the VM management system described with reference to FIG. 3. In block 705, a VM is created. In block 710, the VM management system identifies and stores the requirements for the VM. In block 715, the VM management system places the VM into production. For example, the VM is loaded and executed on, e.g., hosted by, a selected device within a cloud and/or virtual computing environment. In block 720, the VM management system monitors the VM requirements compared to the operational parameters of the hosting device. More particularly, the management system compares the operational parameters of the hosting device with the requirements of the VM as the VM and the hosting device continue to operate over time. The results of the comparison are stored.

Figure 8:
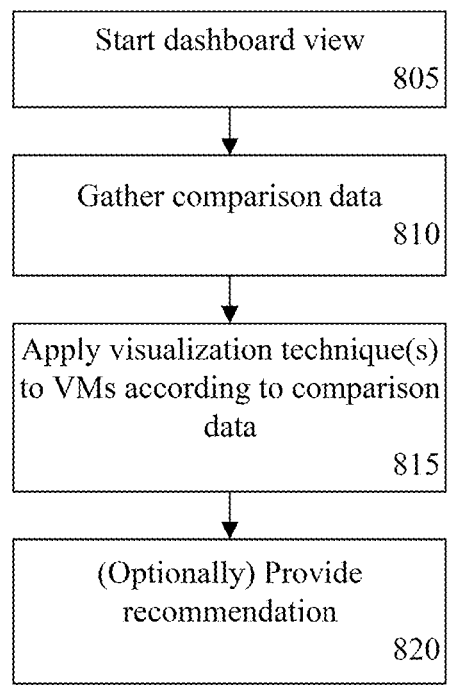
FIG. 8 is a flow chart illustrating an exemplary method of providing a dashboard view for managing VMs.

FIG. 8 is a flow chart illustrating an exemplary method 800 of providing a dashboard view for managing VMs. Method 800 can be performed by the VM management system described with reference to FIG. 3. In block 805, the VM management system starts, e.g., displays a dashboard view of a cloud and/or virtual computing environment. In block 810, the VM management system gathers comparison data described in block 720 of FIG. 7 for the VMs in the clusters that are monitored and illustrated in the dashboard view.

In block 815, the VM management system applies one or more visualization techniques to the identifiers representing VMs in the dashboard view. As noted, the particular visualization technique that is applied indicates whether the requirements of the VM are being met by the device hosting the VM. As such, the result of the comparison effectively determines the particular visualization technique that is applied to the identifiers representing the VMs.

In block 820, the VM management system optionally provides a recommendation for one or more VMs. For example, in the case where the hosting device of a VM is not meeting the requirements of the VM, the VM management system can provide an alternative device as a recommendation to host the VM. The recommendation can be provided automatically responsive to a determination that the hosting device is not meeting the requirements of a VM, responsive to a user request for a recommendation, or the like.

FIG. 9 is a table 900 illustrating an exemplary technique for scoring a device. Table 900 illustrates scoring for a plurality of devices denoted as devices 1, 2, 3, and 4 across three different capabilities denoted as capability 1, 2, and 3. The score shown for each device is capability specific, e.g., a capability score, and is defined by three numbers. For example, referring to device 1 for capability 1, the capability score is 100/12/−1.

The first number of the capability score is a percentage indicating an amount of the capability of the device that is being provided by the device at a given point in time while under load. In this example, device 1 is providing 100% of capability 1. The second number is the number of data points used to calculate the percentage. Thus, in this example, the number 100 indicating that 100% of capability 1 is being provided was determined from 12 data points. In one aspect, the number of data points can be used as a confidence score. As such, the higher the number of data points, the higher the confidence score. Percentages with higher confidence scores are considered more reliable than percentages with lower confidence scores.

In one exemplary implementation, when making a recommendation to move a particular VM, the device that is recommended is selected according to the capability scores. For example, the individual capability scores of the devices can be correlated with the requirements of the VM that is to be moved. For each device considered as a candidate host for the VM to be moved, the percentage portion of each capability score that is correlated with a requirement of the VM to be moved can be summed to calculate a device score. The device having the highest device score can be selected to host the VM. In one example, the percentage portion of the capability scores can be scaled using the confidence score.

The last, or third, number of the score is a trend value. A trend value can be zero (0) indicating a steady state condition, a positive value indicating a rising trend (or percentage), or a negative value indicating a falling trend (or percentage). When the trend is positive or negative, the value of trend indicates the magnitude of the trend. For example, a trend of +2 rises faster than a trend of +1. Similarly, a trend of −2 falls faster than a trend of −1.

The trend values can be used in any of a variety of different ways. Consider the case in which a VM is to be moved from a device that is not meeting the requirements of the VM to a different device. Two candidate devices are selected with equivalent percentages of a same capability score, but with different trend values. If the first candidate device has a steady state trend value and the second candidate device has a negative trend value, the first candidate device is selected to host the VM to be moved. In another example, if the first candidate device has a positive trend value while the second candidate device has a steady state trend value, the first candidate device can be selected to host the VM that is to be moved. In still another example, if the first candidate device has a positive trend value while the second candidate device has a negative trend value, the first candidate device can be selected to host the VM that is to be moved. Thus, the device with the highest (e.g., largest) trend value can be selected in the event of two or more candidate devices have equal scores. When percentage of capability scores are summed as previously described, the trend values can be used to scale the percentage portion of the capability score. Positive trends can result in an increase of the percentage, steady state can result in no change to the percentage, while negative trends can reduce the percentage.

In still another example, when scores of two candidate devices are within a defined range of one another, trend values again can be considered. Thus, a first device with a lower percentage of a capability score than a second device, but still within a defined range of the percentage of the second device can be recommended over the second device to host a VM. Such is the case, for example, if the first device with the lower percentage has a rising trend while the second device with the higher percentage has a negative or steady state trend. Trend magnitude also can be factored into the recommendation.

FIG. 10 is a table 1000 illustrating an exemplary technique for determining a score for a VM. The score for a VM, as illustrated in the example shown in FIG. 10, can be used to determine whether a given VM should be moved to a different device. In FIG. 10, the requirements denoted as 1, 2, 3, and 4 are illustrated for a selected VM. In this example, the scoring for the VM is performed over an interval so as to prevent thrashing of the VM management system where VMs are rapidly moved from one device to another.

Referring to table 1000, requirement 1 for the selected VM is being met at 100% as indicated by the "Current Interval Score." The "Miss Score" indicates the difference between 100 and the "Current Interval Score," which is zero in this case. The Miss Score for requirement 2 is 2. The Miss Score for requirement 3 is 3. The "Multiple" is used to add a weighting, if any, to each of the Miss Scores, which are then summed to obtain the Total Miss Score as reflected in the bottom row. In this example, the Total Miss Score of 9 is calculated as (2×3)+(1×3)=9.

FIG. 11 is a table 1100 illustrating an exemplary technique for determining whether the VM should be transferred to a different hosting device. FIG. 11 illustrates an example of how the interval described with reference to FIG. 10 is determined. FIG. 11 illustrates the scoring for a particular VM. In general, the interval defines the particular data points that are used to calculate the current score for the VM. Data points outside of the interval as defined by a "Start" marker and an "End" marker are not utilized to calculate the current score. Each data point includes a time reference and the Total Miss Score as described with reference to FIG. 10.

At time T+1, the Current Score for a selected VM is 0. The Current Score of 0 at time T+1 is the summation of all Total Miss Scores for the VM within the defined interval across a given row. The end marker for the interval defines the data points used to calculate the "Current Score" of the last column of table 1100. The end marker is set at time T+1 to coincide with the entry of the first data item, regardless of the value of the Total Miss Score entered. The start marker is not set until a non-zero value of the Total Miss Score is recorded.

At time T+2, a Total Miss Score of 5 is recorded for the selected VM. Accordingly, the start marker is added at time T+2 and the end marker is advanced to time T+2. The Current Score is 5, which is derived from the interval including the Total Miss Scores of 0 and 5 from times T+1 and T+2 respectively.

At time T+3, a Total Miss Score of 9 is recorded for the selected VM. The end marker is advanced to time T+3, while the start marker remains at time T+2. The Current Score for the VM is now the sum of the Total Miss Scores recorded at times T+2 and T+3, which is 14.

The start marker is not advanced to a next time slot until a zero value for the Total Miss Score is recorded, which occurs at time T+6. At time T+6, the start marker is advanced by one time slot to time T+3.

The technique continues as illustrated using a changing interval to determine which Total Miss Scores are used in the calculation of the Current Score for a VM. In one example, a move threshold can be set which, if crossed by the Current Score for a VM, causes the VM management system to recommend moving the VM to a different device. For example, if the current score exceeds 400, the VM is to be moved. In another example, the Current Score must cross the move threshold for at least a minimum amount of time, e.g., for a minimum number of data items, to cause the VM management system to recommend moving the VM to a different device. For example, if the current score exceeds 400 for at least some number N time slots, where N is a integer value.

Once the Current Score exceeds the move threshold, or exceeds the move threshold for more than a minimum amount of time, the VM management system determines which device of the virtual computing system, if any, is most appropriate for hosting the VM. The selection of a device to which the VM should be moved can be made by comparing the device scores of devices and/or capability scores of the devices with the requirements of the VM.

In one aspect, the VM management system can identify any, or all, pending requests for movement of a VM that have priority over the recommendation being considered. The management system further can take trend values into account, e.g., disqualify a device that while currently suitable, has a negative trend or a negative trend of at least a particular magnitude.

It should be appreciated that any VMs being considered for movement to a different device for hosting can be re-evaluated from time to time as the need to move the VM may subside as operating conditions within the virtual computing system change over time. Thus, if a particular VM has not been relocated and the need to relocate the VM subsides, this can be indicated as a change in appearance of the identifier representing the VM in the dashboard view.

In another example, an abort threshold can be added that is lower than the move threshold. The abort threshold, for example, can be 200. When the Current Score of the VM is less than or equal to the abort threshold, the VM management system can abort or terminate the decision or recommendation to move the VM. In another example, if the Current Score is less than or equal to the abort threshold for at least a minimum amount of time (e.g., more than a minimum number of time slots), the VM management system can abort the decision or recommendation to move the VM.

Figure 12:
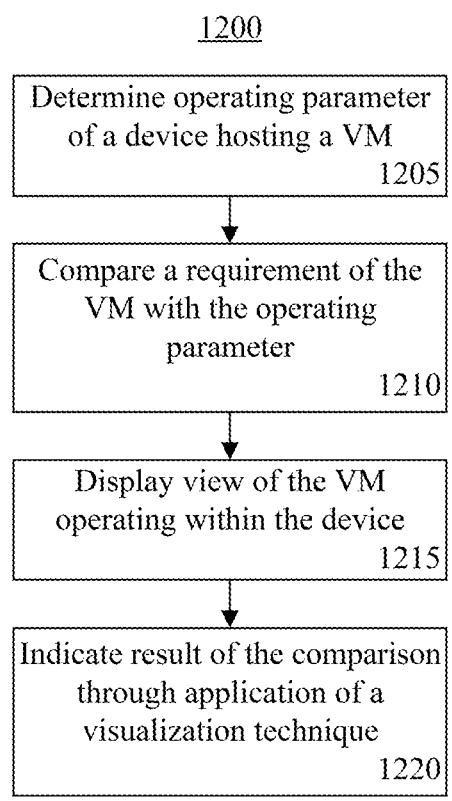
FIG. 12 is a flow chart illustrating an exemplary method of VM management.

FIG. 12 is a flow chart illustrating an exemplary method 1200 of virtual machine management. Method 1200 can be performed by the VM management system as described within this specification. In block 1205, the VM management system determines an operating parameter of a device during operation of the device as part of a cluster of devices while the device hosts a VM. In block 1210, the VM management system compares a requirement for the VM with the operating parameter. The particular requirement used for comparison is one that is correlated with the measured operating parameter. For example, an operating parameter indicating CPU usage of the device would be compared with a CPU requirement of the VM. In block 1215, the VM management system displays a view, e.g., the dashboard view, of the VM operating within the device of the cluster. In block 1220, the VM management system indicates a result of the comparison through application of a visualization technique to an identifier representing the VM within the view.

While FIG. 12 is described with reference to comparing a singular operating parameter of a device with a corresponding requirement of a VM, it should be appreciated that any of the scores previously described can be used for purposes of comparing and determining whether a device is meeting the requirements of a VM.

Within this specification, various techniques and mechanisms are described for managing VMs within a cloud and/or virtual computing environment. A VM can be scored based upon whether the hosting device for the VM is meeting the requirements defined for the VM. A dashboard view is presented indicating the status of VMs in the virtual computing environment to indicate whether requirements of any given VM are being met over time.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method of managing a cluster of a plurality of devices that are used to host a virtual machine, comprising:
    identifying an operating parameter of a device within the cluster that is associated with a requirement for the virtual machine;
    performing a comparison of the requirement for the virtual machine within a current value of the operating parameter while the virtual machine is being hosted by the device;
    displaying a view of the virtual machine operating within the device;
    providing, within the view, a visualization of a result of the comparison;
    generating a capability score for each of the plurality of devices within the cluster;
    generating a device score for each of the plurality of devices within the cluster; and
    providing a recommendation of an alternative device to host the virtual machine based upon the capability score and the comparison, wherein
    the visualization indicates the capability score and whether the requirement for the virtual machine is being met by the device hosting the VM,
    the capability score includes:
        a capability value that indicates an amount of capability that is being provided by a capability device, and
        a trend value that represents a direction in which the capability value is changing, and
    the recommendation is based upon a comparison of a trend value of the device that is currently hosting the virtual machine and a trend value of the alternative device.
2. The method of claim 1, wherein
the alternative device is within the cluster.
3. The method of claim 1, wherein
the alternative device is within a different cluster.
4. The method of claim 1, wherein
the current value of the operating parameter and an indication whether the current value meets the requirement of the virtual machine is displayed in response to an identifier representing the virtual machine being selected within the view.
5. The method of claim 1, wherein
the requirement of the virtual machine and the current value of the operating parameter is displayed in response to an identifier representing the virtual machine being selected within the view.
6. The method of claim 1, wherein
the capability score includes a value indicating a confidence of the capability value.
7. A computer hardware system configured to manage a cluster of a plurality of devices that are used to host a virtual machine, comprising:
    a hardware processor configured to initiate the following executable operations:
        identifying an operating parameter of a device within the cluster that is associated with a requirement for the virtual machine;
        performing a comparison of the requirement for the virtual machine within a current value of the operating parameter while the virtual machine is being hosted by the device;
        displaying a view of the virtual machine operating within the device;
        providing, within the view, a visualization of a result of the comparison;
        generating a capability score for each of the plurality of devices within the cluster;
        generating a device score for each of the plurality of devices within the cluster; and
        providing a recommendation of an alternative device to host the virtual machine based upon the capability score and the comparison, wherein
    the visualization indicates the capability score and whether the requirement for the virtual machine is being met by the device hosting the VM,
    the capability score includes:
        a capability value that indicates an amount of capability that is being provided by a capability device, and
        a trend value that represents a direction in which the capability value is changing, and
    the recommendation is based upon a comparison of a trend value of the device that is currently hosting the virtual machine and a trend value of the alternative device.
8. The system of claim 7, wherein
the alternative device is within the cluster.
9. The system of claim 7, wherein
the alternative device is within a different cluster.
10. The system of claim 7, wherein
the current value of the operating parameter and an indication whether the current value meets the requirement of the virtual machine is displayed in response to an identifier representing the virtual machine being selected within the view.
11. The system of claim 7, wherein
the requirement of the virtual machine and the current value of the operating parameter is displayed in response to an identifier representing the virtual machine being selected within the view.
12. The system of claim 7, wherein
the capability score includes a value indicating a confidence of the capability value.
13. A computer program product, comprising:
a computer-readable storage medium having program code stored thereon for managing a cluster of a plurality of devices that are used to host a virtual machine,
the program code, which when executed by a computer hardware system, causes the computer hardware system to perform:

identifying an operating parameter of a device within the cluster that is associated with a requirement for the virtual machine;

performing a comparison of the requirement for the virtual machine within a current value of the operating parameter while the virtual machine is being hosted by the device;

displaying a view of the virtual machine operating within the device;

providing, within the view, a visualization of a result of the comparison;

generating a capability score for each of the plurality of devices within the cluster;

generating a device score for each of the plurality of devices within the cluster; and providing a recommendation of an alternative device to host the virtual machine based upon the capability score and the comparison, wherein the visualization indicates the capability score and whether the requirement for the virtual machine is being met by the device hosting the VM, the capability score includes:

a capability value that indicates an amount of capability that is being provided by a capability device, and a trend value that represents a direction in which the capability value is changing, and the recommendation is based upon a comparison of a trend value of the device that is currently hosting the virtual machine and a trend value of the alternative device.

14. The computer program product of claim 13, wherein the alternative device is within the cluster.

15. The computer program product of claim 13, wherein the alternative device is within a different cluster.

16. The computer program product of claim 13, wherein the current value of the operating parameter and an indication whether the current value meets the requirement of the virtual machine is displayed in response to an identifier representing the virtual machine being selected within the view.

17. The computer program product of claim 13, wherein the requirement of the virtual machine and the current value of the operating parameter is displayed in response to an identifier representing the virtual machine being selected within the view.

18. The computer program product of claim 13, wherein the capability score includes a value indicating a confidence of the capability value.

* * * * *